Oct. 6, 1970  D. F. BREMNER, JR., ET AL  3,532,005

GEAR REDUCTION UNIT

Filed Feb. 16, 1968  2 Sheets-Sheet 1

INVENTORS.
David F. Bremner, Jr. &
BY Keith H. Carpenter

W. A. Schuetz
ATTORNEY

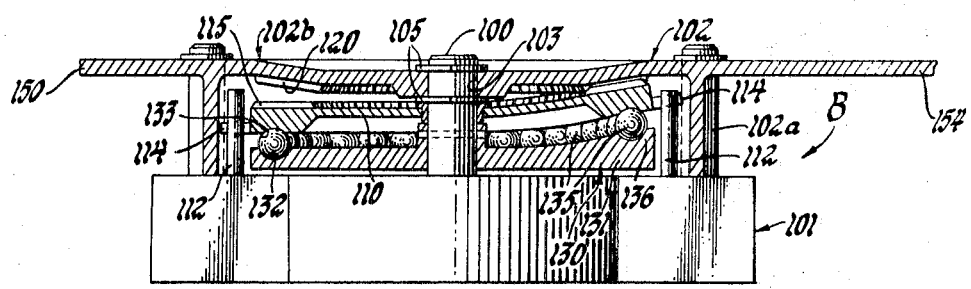
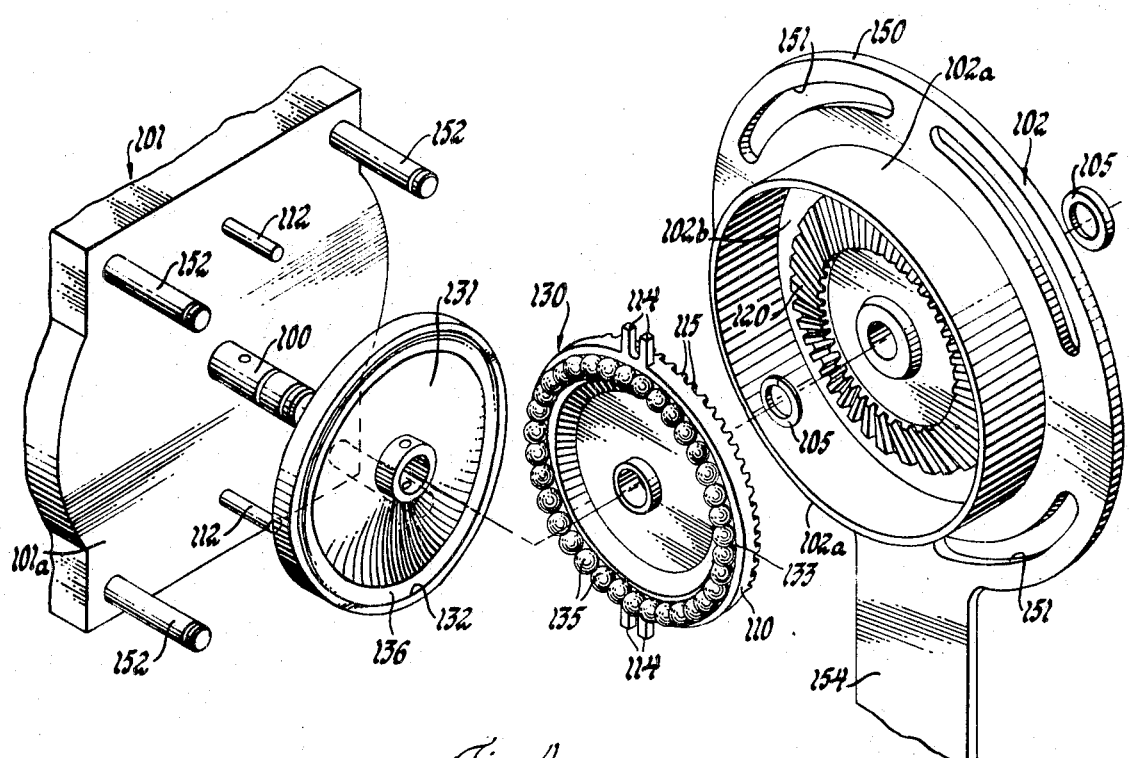

United States Patent Office 3,532,005
Patented Oct. 6, 1970

3,532,005
GEAR REDUCTION UNIT
David F. Bremner, Jr., Bellbrook, and Keith H. Carpenter, Kettering, Ohio, assignors to General Motors Corporation, Detroit, Mich., a corporation of Delaware
Filed Feb. 16, 1968, Ser. No. 705,960
Int. Cl. F16h 1/100, 23/00, 37/00
U.S. Cl. 74—640          3 Claims

ABSTRACT OF THE DISCLOSURE

This disclosure relates to a harmonic drive mechanism having a rotatable harmonic wave generator means for continuously flexing different portions of an annular face gear on a flexible member into engagement with teeth on an annular face gear on a second member. The number of teeth on the respective face gears are different and one of the members is held against rotation whereby the other of the members is rotated relative to the one member.

---

The present invention relates to harmonic drive mechanisms, and in particular to harmonic drive speed reduction units for effecting large speed reductions.

An important object of the present invention is to provide a new and improved harmonic drive mechanism which is of a highly practical and economical construction and which comprises a relatively thin unit or package.

Another object of the present invention is to provide a new and improved harmonic drive mechanism in which the harmonic drive is a flat face harmonic drive.

Another object of the present invention is to provide a new and improved harmonic drive speed reduction unit which comprises a relatively thin unit or package and which is particularly suitable for use as a speed reduction unit in applications where the space provided for the gear reduction unit is very narrow.

Yet another object of the present invention is to provide a new and improved harmonic drive speed reduction unit in which a harmonic wave generator is rotated by an input member to continuously flex different portions of a flexible annular face gear into engagement with the teeth on an annular face gear on a second member, and in which the number of teeth on the respective face gears are different and wherein one of the gears is held against rotation so as to effect rotational movement of the other gear at a reduced speed as compared to the rotational speed of the input member.

A further object of the present invention is to provide a new and improved harmonic drive speed reduction unit and in which a harmonic wave generator is rotated by an input member to continuously flex different portions of an annular face gear on the flexible plate held against rotation into engagement with the teeth on an annular face gear of a rotatable output member, and in which the number of teeth on the gear on the flexible plate is less than the number of teeth on the gear on the output member so that when the flexible plate is flexed the output member is rotated at a substantially lesser rotative speed than the input member.

A still further object of the present invention is to provide a new and improved harmonic drive speed reduction unit, as defined in the next preceding object, and in which a two-stage speed reduction is effected and in which the rotatable output member of the first stage carries a harmonic wave generator for flexing the flexible plate of the second stage.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the views of each embodiment and in which:

FIG. 3 is an axial cross-sectional view with parts thereof shown in elevation of another embodiment of the harmonic drive mechanism of the present invention; and FIG. 4 is an exploded perspective view of the harmonic drive mechanism shown in FIG. 3.

The present invention provides novel harmonic drive mechanisms, and in particular provides novel harmonic drive speed reduction units for effecting relatively large speed reductions. Although the novel speed reduction units of the present invention could be used in various applications wherein a speed reduction is desired, they are particularly susceptible for use in applications which require that the unit be a relatively thin package due to space requirements. For example, in automotive vehicles the space provided for the various power operated drive units for actuating different components of the vehicle is often relatively small or narrow, such as the relatively narrow space provided between the inner and outer panels of a door for a drive unit to actuate a window regulator mechanism. For the purposes of illustration, the harmonic drive speed reduction units will be described as being used for the purpose of actuating a window regulator mechanism for raising and lowering a window of an automotive vehicle.

Figure 1:
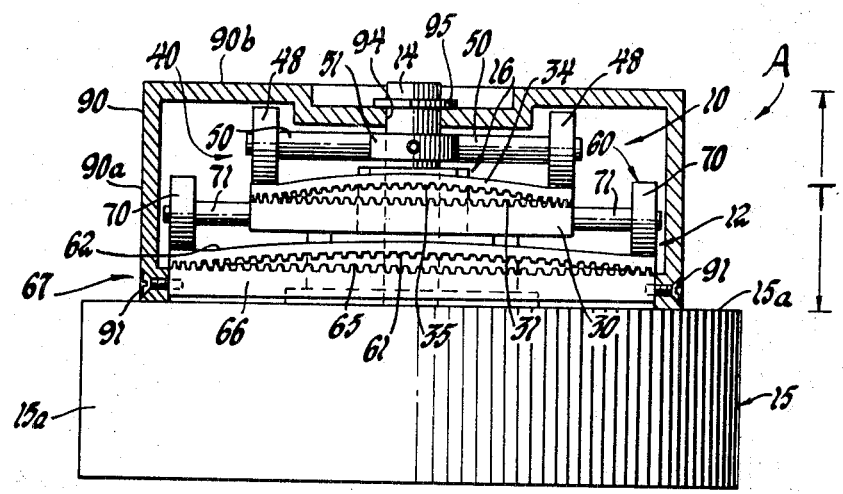
FIG. 1 is a side elevational view with parts thereof shown in section of one embodiment of a harmonic drive mechanism of the present invention.
Figure 2:
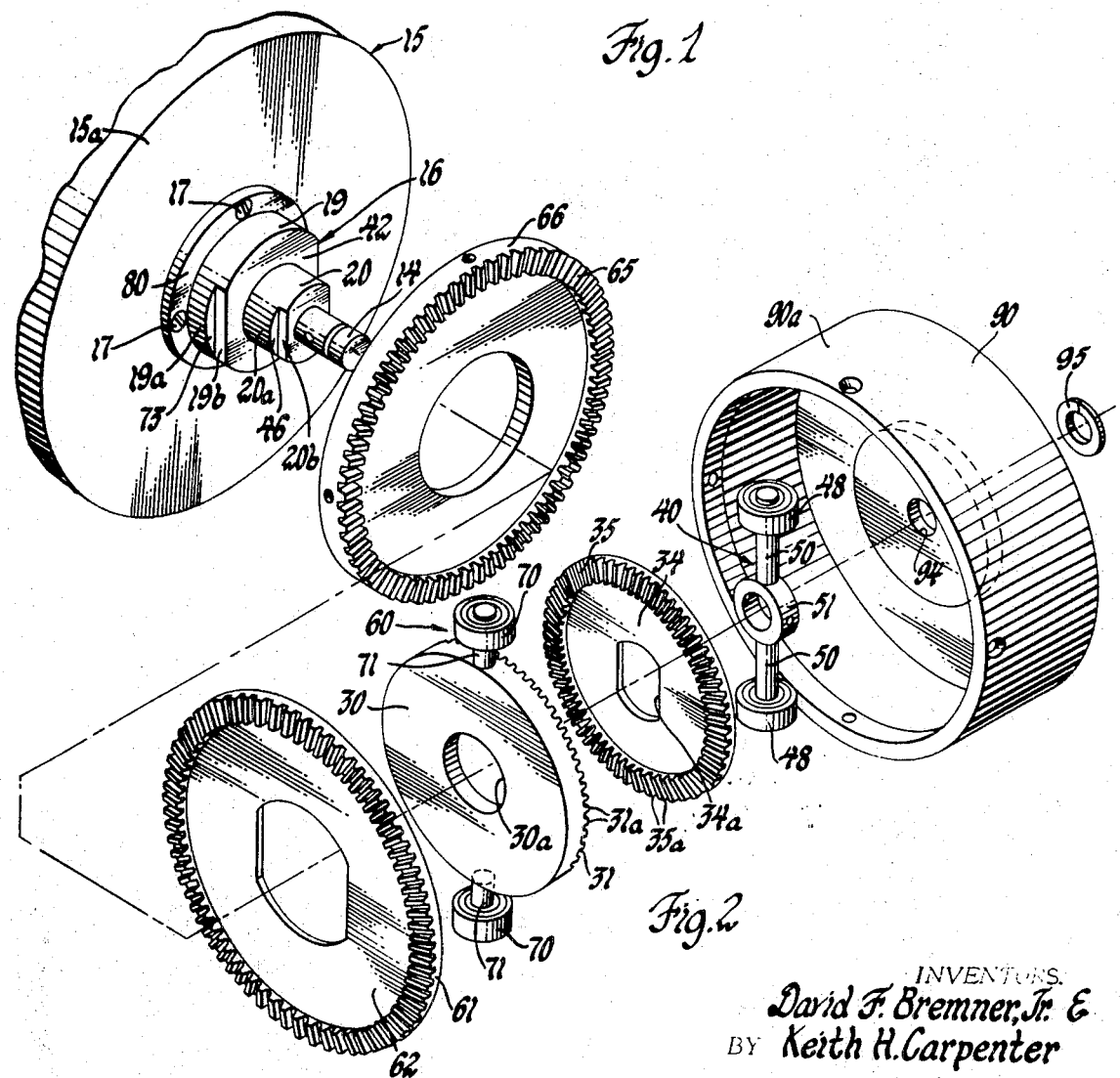
FIG. 2 is an exploded perspective view of the harmonic drive mechanism shown in FIG. 1.

As representing one embodiment of the present invention, FIGS. 1 and 2 of the drawings show a harmonic drive speed reduction unit A which is adapted to be disposed within a door of an automotive vehicle and suitably supported thereby. The speed reduction unit A, in the illustrated embodiment, is a two-stage speed reduction unit having a primary and secondary speed reduction means 10 and 12, respectively.

The speed reduction unit A comprises an input member or shaft 14 which is adapted to be rotated or driven by a motor 15. The shaft 14 preferably is the motor shaft and the motor 15 is preferably a reversible, electrically actuatable, disc type motor of any suitable or conventional construction. The input shaft 14 is rotatably journaled within a bearing means 16 secured to the motor housing 15a in any suitable manner, such as by screws 17. The bearing means 16 includes an outer bearing housing or support having large diameter section 19 and a small diameter section 20 and with each of the sections 19 and 20 having circular and noncircular portions 19a and 19b and 20a and 20b, respectively.

The primary speed reduction means 10 includes, in general, an output or driven member 30 which is adapted to be rotated at a lesser rotative speed than the input shaft 14 and which has an annular face gear 31 on one side thereof, a flexible plate or member 34 having an annular face gear 35 on its side facing the annular face gear 31 on the output member 30 and which is held against rotation relative to the input member 14, and a harmonic wave generator means 40 carried by the input member 14 for rotation therewith and which functions to continuously flex different portions of the face gear 35 on the flexible plate 34 into engagement with the annular face gear 31 on the output member 30 to effect a rotation of the output member at a lesser rotative speed.

The output member 30 is concentric with the input member 14 and is rotatably supported on the circular portion 20a of the small diameter section 20 of the bearing housing. The output member 30 has a central through opening 30a for receiving the circular portion 20a and is held in position against an annular radially extending shoulder or surface 42 at the juncture of the small and large diameter sections 20 and 19 of the bearing housing by the flexible plate 34.

The flexible plate 34 is a thin, annular member which is concentrically disposed with respect to the input member 14. The plate 34 has a noncircular central opening 34a shaped complementary with and which slidably receives the noncircular portion 20b of the small diameter section 20 of the bearing housing. The provision of the noncircular opening 34a and the noncircular portion 20b prevents the flexible plate 34 from rotating relative to the bearing means 16. The flexible plate 34 is self-biased toward a position in which it lies in a plane extending radially of the input shaft 14 and with its annular face gear 35 spaced from the face gear 31 on the output member 30. The flexible plate is held against a pair of diametral opposite shoulders 46 at the junction of the circular and noncircular portions 20a and 20b, respectively, by the harmonic wave generator means 40.

The annular face gear 35 on the flexible plate 34 is adapted to continuously have different portions thereof flexed toward and into engagement with the annular face gear 31 in opposition to its self-biasing forces by the harmonic wave generator means 40 when the latter is rotated. The harmonic wave generator means 40 includes a pair of annular rollers or bearings 48 rotatably supported at the outer ends of a pair of arms or rods 50 extending in opposite directions radially of the input shaft 14. The inner ends of the rods 50 are secured to a hub 51 which in turn is fixed to the input shaft 14 so that the entire harmonic wave generator means 40 is rotated with the input shaft 14.

As best shown in FIG. 1, the rollers 48 cause diametral opposite portions of the flexible plate 34 and gear 35 to be flexed toward and into engagement with the gear 31 on the output member 30 so that some of the teeth 35a on the annular face gear 35 engage the teeth 31a on the face gear 31 and with intermediate portions of the flexible plate 34 and gear 35 being disengaged or spaced from the gear 31. The number of teeth 35a on the annular face gear 35 on the flexible plate 34 is less than the number of teeth 31a on the face gear 31 on the output member 30. Preferably, the face gear 35 has two less teeth than the output member 30, since two wave generators or rollers 48 are employed.

From the foregoing, it should be apparent that when the input shaft 14 is rotated the rollers 48 are rotated. When the rollers 48 are rotated they roll on the flexible plate 34 so as to continuously cause diametral opposite portions of the flexible plate 34 to be flexed toward the output member 30 and with some of the teeth 35a on the annular face gear 35 continuously meshingly engaging the teeth 31a on the annular face gear 31 at diametral opposite locations on the latter. Since the flexible plate 34 is held against rotation and since there are two less teeth on the gear 35 than on the gear 31, the output member 30 will be caused to rotate an angular distance equal to the distance between two teeth for each revolution of the harmonic wave generator means or input shaft 14. For example, if the number of teeth on the face gear 35 is 40 and the number of teeth on the face gear 31 is 42, a 20 to 1 gear reduction is effected so that the output member 30 will be rotated one revolution for every twenty revolutions of the input shaft 14.

The output member 30 of the primary speed reduction means 10 also forms the input member for the secondary speed reduction means 12. The output member 30 carries a harmonic wave generator means 60 for continuously flexing different portions of an annular face gear 61 on a flexible plate or member 62 into engagement with an annular face gear 65 on an annular ring or member 66 of an output means 67 of the secondary speed reduction means 12. The harmonic wave generator means 60 includes a pair of annular rollers or bearings 70 rotatably supported at the outer ends of a pair of arms or rods 71 extending in diametral opposite directions radially of the output member 30. The inner ends of the rods 70 are secured to the output member in any suitable manner so that the harmonic wave generator means 60 is rotated when the output member 30 of the primary speed reduction means 10 is rotated.

The flexible plate 62 is nonrotatably supported by the noncircular portion 19b of the large diameter section 19 of the bearing housing in the same manner as previously described for the flexible plate 34, and is positioned or held against a radially extending shoulder 73 at the juncture of the circular and noncircular portions 19a and 19b, respectively, by the rollers 70. The flexible plate 62 is self-biased toward a position in which it lies in a plane extending radially of the input shaft 14 and with its annular face gear 61 spaced from the annular face gear 65 on the ring 66.

The output ring 66 is concentric with respect to the input shaft 14 and is rotatably supported by the circular portion 19a of the section 19 of the bearing housing and is positioned or held against an annular radially extending flange 80 of the bearing means 16 by the flexible plate 62. The ring 66 is secured to a cup shaped member 90 of the output means 67, such as by screws 91. The cup shaped member 90 includes an axially extending portion 90a and a radially extending portion 90b which is rotatably supported by the input shaft 14. To this end, the portion 90b has a central opening 94 for receiving the shaft 14. The cup shaped member 90 is restrained against movement axially of the input shaft 14 away from the motor 15 by an annular snap ring 95.

As with the speed reduction means 10, the number of teeth on the annular face gear 61 on the flexible plate 62 is less than the number of teeth on the face gear 65 of the output ring 66. Preferably the face gear 61 has two less teeth than the face gear 65 on the output ring, since two harmonic wave generators or rollers 70 are employed.

From the foregoing, it should be apparent that when the output member 30 of the primary speed reduction means 10 is rotated, the rollers 70 are rotated. When the rollers 70 are rotated they roll on the flexible plate 62 so as to continuously cause diametral opposite portions of the face gear 61 and the flexible plate 62 to be flexed toward the face gear 65 on the output ring 66 and in opposition to the self-biasing forces of the flexible plate 62 so that some of the teeth 61a on the annular face gear 61 continuously meshingly engage the teeth 65 on the annular face gear 65 at diametral opposite locations on the latter. Since the flexible plate 62 is held against rotation and since there are two less teeth on the gear 61 than on the gear 65, the output ring 66 will be caused to rotate an annular distance equal to the distance between the two teeth for each revolution of the member 30 of the primary speed reduction means 10. For example, if the number of teeth on the face gear 61 is 60 and the number of teeth on the face gear 65 is 62, a 30 to 1 gear reduction is effected so that the output ring 66 will be rotated one revolution for every 30 revolutions of the output member 30 of the primary speed reduction means 10. Moreover, it can be seen that if the primary speed reduction means 10 effects a 20 to 1 speed reduction and the secondary speed reduction means 12 effects a 30 to 1 speed reduction, the overall speed reduction effected is 600 to 1. It will, of course, be understood that the number of teeth provided on the gears of the respective flexible plates and the associated gears on the output members could be varied so that any suitable or desired speed reduction can be effected.

The cup-shaped output member 90 is adapted to be connected with or formed integral with an arm for actuating a window regulator mechanism. Since the motor 15 is reversible, it can be rotated in either direction and thus, the output member 90 can be rotated in either direction so as to effect either a raising or lowering of the window of the automotive vehicle.

By providing a face gear harmonic drive, a thin speed reduction unit or package is provided. It is contemplated, for example, that the speed reduction unit A could be made so that the thickness of the unit or package, as indicated by the dimension T in FIG. 1, would be less than an inch and could be as small as 6/10 of an inch. This coupled with the fact that disc motors are very thin provides an overall unit or package which is very thin. Although the speed reduction unit A shown in FIGS. 1 and 2 is a two-stage speed reduction unit, it will, of course, be understood that the second stage could be eliminated, if desired. An advantage, however, of using the two-stage speed reduction unit as opposed to a one-stage speed reduction unit is that a large speed reduction can be effected even though relatively high torque loads are being transmitted, since the teeth on the respective face gears can be made larger and stronger so as to enable larger torque loads to be transmitted.

Moreover, it should be noted that the cup-shaped member 90 forms an enclosure for the remainder of the gear reduction unit A and has its inner end, i.e., the end adjacent the motor housing 15a, closely spaced from the motor housing. This provides an enclosure which substantially seals the gear reduction unit A from the surrounding atmosphere. Also, the gear reduction unit A is symmetrically balanced with respect to the common axis of rotation of the various rotating members and the forces are directed axially toward the motor housing 15a.

As representing another embodiment of the present invention, FIGS. 3 and 4 of the drawings show a single stage speed reduction unit B. The speed reduction unit B includes an input shaft or member 100 which is adapted to be rotated or driven by a motor 101. The shaft 100 preferably is the motor shaft and the motor 101 is preferably a reversible, electrically operated, disc type motor of any suitable or conventional construction. Rotatably supported by the input shaft 100 adjacent its end remote from the motor 101 is an output member 102.

The output member 102 is generally cup-shaped and includes an axially extending side wall 102a and a radially inwardly extending bottom wall 102b which has a central through opening 103 for slidably receiving the input shaft 100. The output member 102 is restrained against axial movement relative to the input shaft 100 by a pair of snap rings 105 carried by the input shaft 100 and disposed on opposite sides of the bottom wall 102b.

The speed reduction unit B further includes an annular flexible plate 110 disposed within the cup-shaped output member 102 and rotatably supported by the input shaft 100 intermediate its ends. The flexible plate 110 is held against rotation by a pair of pins 112 carried by the motor housing 101a and which are received between pairs of spaced radially extending projections 114 at diametral opposite locations on the flexible plate 110. The flexible plate 110 has an annular face gear 115 on its side facing the bottom wall 102b of the output member 102 and which is adapted to engage an annular face gear 120 on the bottom wall 102b of the output member 102. The flexible plate is self-biased toward a position in which it lies in a plane extending radially of the input shaft 100 and with its annular face gear 115 spaced from the annular face gear 120 on the output member 102.

A portion of the annular face gear 115 on the flexible plate 110 is adapted to be continuously flexed toward and into engagement with the annular face gear 120 on the output member 102 by a harmonic wave generator means 130 when the latter is rotated. The harmonic wave generator means 130 includes a rigid, annular member 131 fixed to the input shaft 100 between the flexible plate 110 and the motor housing 101a. The annular member 131 and the flexible plate have aligned annular grooves 132 and 133, respectively, and with the two grooves receiving and holding a plurality of balls or ball bearings 135 therebetween. The annular member 131 is axially thicker along one annular portion thereof to define a ramp portion 136 which through the balls 135 causes a portion of the flexible plate 110 to be flexed toward the bottom wall 102b of the output member 102.

As best shown in FIG. 3, the ramp portion 136 of the annular member 131 through the balls causes a portion of the flexible plate 110 and face gear 115 to be flexed toward and into engagement with the face gear 120 on the output member 102 so that some of the teeth on the annular face gear 115 engage the teeth on the face gear 120, the remaining portion of the face gear 115 of the flexible plate being disengaged from the face gear 120. The number of teeth on the annular face gear 115 on the flexible plate 110 is less than the number of teeth on the face gear 120 on the output member 102. Preferably, the face gear 115 has one less tooth than the face gear 120 on the output member, since only one wave generator or ramp portion 136 is provided.

From the foregoing, it should be apparent that when the input shaft 100 is rotated, the annular member 131 of the harmonic wave generator means 130 is rotated. When the annular member 131 is rotated the balls 135 disposed along the ramp portion 136, which balls freely roll or rotate relative to the flexible plate 110 and annular member 131, continuously cause a different portion of the annular face gear 115 and flexible plate 110 to be flexed toward the face gear 120 on the output member 102 so that some of the teeth on the annular face gear 115 continuously engage the teeth on the annular face gear 120. Since the flexible plate 110 is held against rotation and since there is one less tooth on the gear 115 than on the gear 120, the output member 102 will be caused to rotate an angular distance equal to the distance of one tooth for each revolution of the input shaft 100. For example, if the number of teeth on the face gear 115 is 40 and the number of teeth on the face gear 120 is 41, a 40 to 1 gear reduction is effected so that the output member 102 will be rotated one revolution for every 40 revolutions of the input shaft 100.

As best shown in FIG. 3, the annular face gear 120 is on an annular portion 140 of the bottom wall 102b which tapers inwardly toward the input shaft 14 and downwardly toward the motor housing 101a. This provides for a flush engagement between the teeth of the respective face gears 115 and 120 when the face gear 115 is flexed into engagement with the face gear 120.

As best shown in FIG. 4, the output member 102 has the radially outwardly extending flange 150 provided with circumferentially spaced, circumferentially extending elongated slots 151 through which pins 152 carried by the motor housing 101a are slidably received. The outer flange 150 also includes a radially extending arm 154 which is adapted to be suitably connected with the window of an automotive vehicle for effecting a raising and lowering of the same depending upon the direction of rotation of the output member 102. The provision of the slots 151 enable the output member 102 to rotate in opposite directions a predetermined angular extent. It will, of course, be understood that the slots and pins could be eliminated, if desired.

The various face gears in the illustrated embodiment are preferably formed integral with their respective flexible plates and output members and their respective gear teeth can be of any suitable or standard profile. Also, in the harmonic drive speed reduction units A and B described above, the respective output members could be held stationary and the flexible plates freely rotatable relative to the input shafts, in which case the flexible plates would be rotated relative to the output members and the drive taken from the flexible plates. Additionally, it should be apparent to those skilled in the art that units A and B could be used as speed increasers.

Although the illustrated embodiments hereof have been described in great detail, it should be apparent that certain modifications, changes, and adaptations may be made in the illustrated embodiments, and that it is intended to cover all such modifications, changes and adaptations which come within the scope of the appended claims.

What is claimed is:

1. An actuator mechanism for use in effecting movement of a component of an automotive vehicle, such as a window regulator mechanism, in opposite directions comprising: a reversible disc-shaped electric motor and a gear reduction unit having an input shaft rotated by said motor, said gear reduction unit comprising a cup-shaped output member which is adapted to be connected with the component of the vehicle and which is supported for rotation by said shaft, said output member being adapted to be driven at a lesser rotative speed than said shaft and having the end of its side wall remote from its bottom wall closely spaced from the disc-shaped electric motor to provide an enclosure for the gear reduction unit, said output member carrying an annular face gear at its end remote from its bottom wall and closely adjacent said disc-shaped motor and with the face gear lying in a plane which extends substantially radially of said shaft; a flexible member concentric with said shaft but which is held against rotation relative to said shaft, said flexible member being located adjacent said face gear and being self-biased toward a position in which it lies in a plane which extends radially of said shaft, said flexible member having an annular face gear on its side facing the face gear carried by the output member, said face gear carried by the output member having a greater number of teeth than the face gear of the flexible member, and a harmonic wave generator means rotated by said shaft and which is engageable at all times with a portion of the flexible member to flex a portion thereof toward said output member and cause some of the teeth on the face gear of the flexible member to engage the teeth on the face gear carried by the output member, said harmonic wave generator means when rotated continuously causing different portions of the flexible member to engage the output member and thereby effect rotation of the output member at a rotative speed which is less than the rotative speed of the input member, said cup-shaped output member and said disc-shaped electric motor providing a relatively thin package, as measured axially thereof, said harmonic wave generator means being located adjacent the bottom of the cup-shaped output member and includes rollers in rolling engagement with the flexible member.

2. An actuator mechanism for use in moving a component of a vehicle, such as a window regulator mechanism in opposite directions comprising a reversible disc-shaped electric motor having a shaft extending axially from one side thereof; a two stage gear reduction unit including a first output member supported for rotation relative to said shaft intermediate the ends of the latter and which is adapted to be rotated at a lesser rotative speed than the shaft, said first output member having an annular face gear on one side thereof and lying in a plane extending radially of said shaft; a first flexible plate like member which is held against rotation and which is located adjacent said first output member, said first flexible member having an annular face gear on its side facing the face gear on the first output member and the face gear on the first output member having a greater number of teeth than the face gear on said first flexible member, said first flexible member being biased toward a position in which it lies in a plane extending radially of said shaft, a first harmonic wave generator means fixed to said shaft adjacent its end remote from said disc-type motor for rotation therewith and which is engageable at all times with a portion of said first flexible member to flex a portion toward said first output member and cause some of the teeth on the face gear of the first flexible member to engage the teeth on the face gear of the first output member to rotate the latter at a lesser rotative speed than the shaft, a second cup-shaped output member which is adapted to be rotated at a lesser rotative speed than the first output member, said second cup-shaped output member having its bottom wall spaced from said disc-type motor and the end of its side wall remote from the bottom wall closely adjacent the disc-shaped motor to provide an enclosure for the gear reduction unit, said second output member carrying an annular face gear at its end closely adjacent said disc-shaped motor and with the face gear lying in a plane extending radially of said shaft, a second flexible member which is held against rotation and which is located adjacent said face gear carried by said second output member, said second flexible member having an annular face gear on its side facing the face gear on said second output member and said face gear of said second output member having a greater number of teeth than the face gear of said second flexible member, said second flexible member being biased toward a position in which it is located in the plane extending radially of said shaft, a second harmonic wave generator means fixed to said first output member for rotation therewith and which is engageable at all times with a portion of said second flexible member to flex the portion toward said second output member and cause the teeth on the face gear of the second flexible member to engage the teeth on the face gear of said second output member to rotate the latter at a lesser rotative speed than the first output member, said actuator mechanism being a relatively thin package, as measured in a direction axially of the shaft.

3. A mechanism as defined in claim 2 wherein said cup-shaped output member has a dimension as measured axially of said shaft which is less than an inch and wherein said first and second harmonic wave generator means comprise rollers carried by radially extending arms fixed to said shaft and said first output member, respectively.

References Cited

UNITED STATES PATENTS

| | | | |
|---|---|---|---|
| 2,849,897 | 9/1958 | Walma | 74—640 X |
| 2,906,143 | 9/1959 | Musser | 74—640 |
| 3,139,772 | 7/1964 | Maroth | 74—800 |
| 3,145,585 | 8/1964 | Brown | 74—805 |
| 3,187,605 | 6/1965 | Stiff | 74—640 |
| 3,353,426 | 11/1967 | Wiser et al. | 74—800 |
| 3,374,372 | 3/1968 | Tinder et al. | 74—640 X |
| 3,415,144 | 12/1968 | Carson | 74—640 |

DONLEY J. STOCKING, Primary Examiner

T. C. PERRY, Assistant Examiner

U.S. Cl. X.R.

49—349; 74—800